United States Patent [19]
Larsson

[11] Patent Number: 5,996,093
[45] Date of Patent: *Nov. 30, 1999

[54] METHOD AND DEVICE TO CONTROL A MEMORY

[75] Inventor: Leif Mikael Larsson, Stockholm, Sweden

[73] Assignee: Telefonaktiebolaget LM Ericsson, Stockholm, Sweden

[ * ] Notice: This patent is subject to a terminal disclaimer.

[21] Appl. No.: 08/829,507

[22] Filed: Mar. 28, 1997

Related U.S. Application Data

[63] Continuation of application No. 08/385,176, Feb. 7, 1995, Pat. No. 5,644,708.

[30] Foreign Application Priority Data

Feb. 10, 1994 [SE] Sweden ................................. 9400435

[51] Int. Cl.$^6$ ............................................... G06F 11/00
[52] U.S. Cl. ............................. 714/49; 714/53; 714/805
[58] Field of Search ..................... 395/185.02, 185.01, 395/185.06, 185.07, 182.03, 182.04, 183.18; 371/51.1, 49.1, 48, 37.7, 49.2, 21.1, 21.2, 2.2; 714/49, 48, 53, 54, 5, 6, 805, 718, 719

[56] References Cited

U.S. PATENT DOCUMENTS

| | | | |
|---|---|---|---|
| 3,914,741 | 10/1975 | Bonser et al. | 371/51.1 |
| 4,019,033 | 4/1977 | Parmet | 371/51.1 |
| 4,020,459 | 4/1977 | Coomer | 371/51.1 |
| 4,142,243 | 2/1979 | Bishop et al. | 395/183.13 |
| 4,271,521 | 6/1981 | Mahmood | 371/49.3 |
| 4,692,893 | 9/1987 | Casper | 395/875 |
| 4,809,278 | 2/1989 | Kim et al. | 371/51.1 |
| 4,811,347 | 3/1989 | Bolt | 371/51.1 |
| 5,321,706 | 6/1994 | Holm et al. | 371/51.1 |
| 5,337,317 | 8/1994 | Takamisawa et al. | 371/40.4 |
| 5,361,252 | 11/1994 | Sällberg et al. | 370/230 |
| 5,392,302 | 2/1995 | Kemp et al. | 371/51.1 |
| 5,477,553 | 12/1995 | Kong | 371/51.1 |
| 5,537,425 | 7/1996 | Tsou | 371/51.1 |
| 5,537,428 | 7/1996 | Larson et al. | 371/37.1 |

OTHER PUBLICATIONS

"Parity Mechanism for Detecting Both Address and Data Errors", J.D. Dixon et al., *IBM Technical Disclosure Bulletin*, vol. 24, No. 1B, Jun. 1981.

Primary Examiner—Dieu-Minh T. Le
Attorney, Agent, or Firm—Burns, Doane, Swecker & Mathis, L.L.P.

[57] ABSTRACT

A method and a device for determining that digital information written into a memory is correctly readable before such read information, in the form of a number of coordinated bit positions, is used to control one or several functions, where the functions can be activated by a computer unit. A selected address position or positions within the memory corresponding to the stored digital information points out a first set of bits, required to control and/or initiate the functions, and a second set of bits serving as a control sum. The second set of bits is calculated taking into consideration the current set of bits corresponding to the first set of bits and a third set of bits, corresponding to the address position currently selected for readout. When the following readout of the digital information out of the memory is performed, a new control sum is calculated in the same way, taking into consideration the currently read bit positions corresponding to the first set of bits and a fourth set of bits corresponding to the address position currently selected for readout, to form a fifth set of bits. The read digital information is accepted as correct when a comparison is performed and agreement is found between the second set of bits and the fifth set of bits.

10 Claims, 3 Drawing Sheets

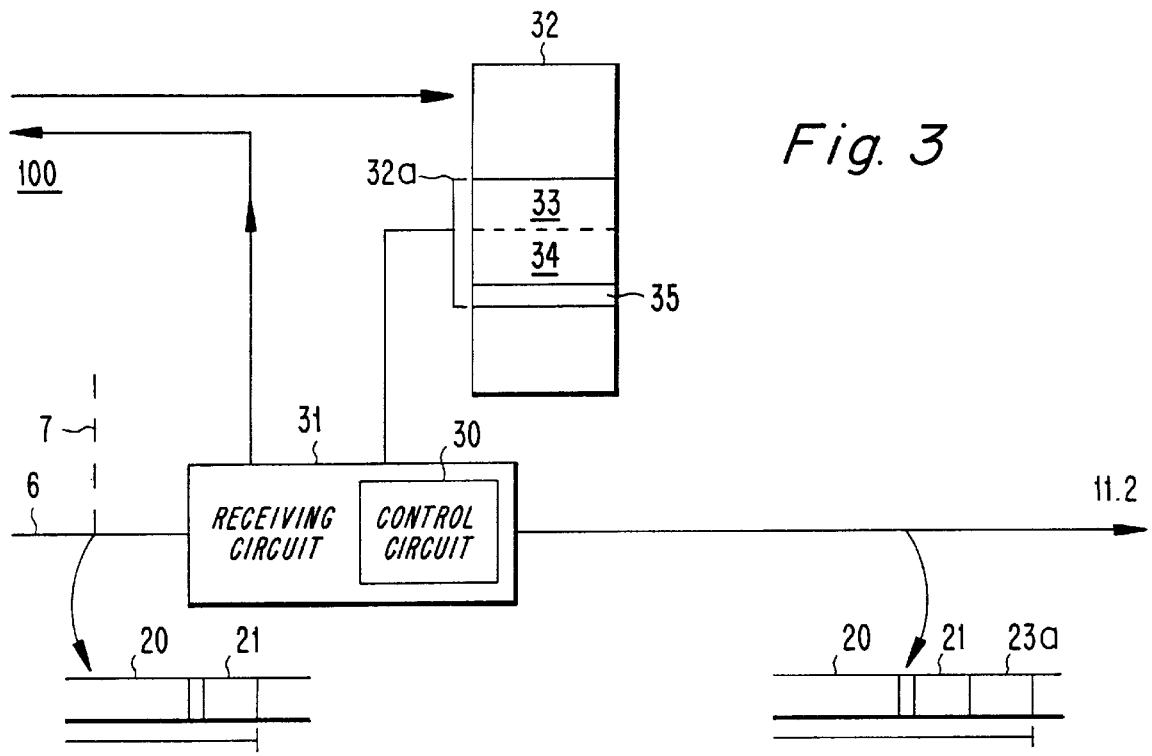
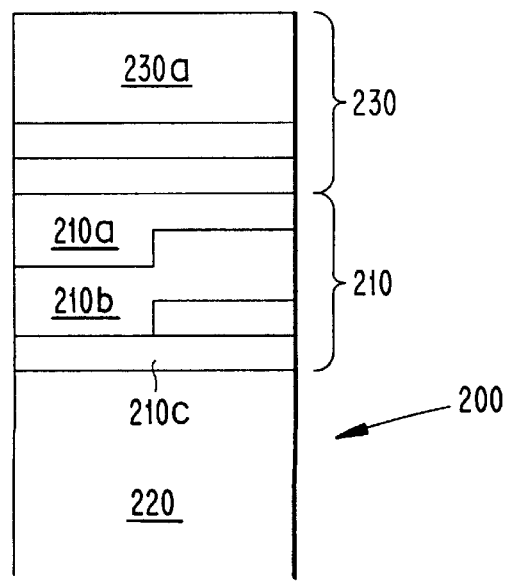
Fig. 3
Fig. 4

METHOD AND DEVICE TO CONTROL A MEMORY

This application is a continuation of application Ser. No. 08/385,176, filed Feb. 7, 1995, now U.S. Pat. No. 5,644,708.

BACKGROUND

This invention relates to a method of controlling information stored at an address that is pointed out in a memory so that the information is correctly readable before that information is used to control various functions. This invention also relates to a device that can coact with a memory and ensure that digital information, written into and stored within the memory, is correctly readable.

The method and the device or control circuit according to the invention are more specifically intended to ensure that information is correct, where the information is readable from a control memory, or more specifically out of a location in the control memory pointed out by an address, and where the information is coordinated into a data packet.

In a more specific application in a telecommunication system, the invention is intended to ensure that information stored within a control memory is correctly readable before that information is used to control functions within a switching unit.

Within such a communication system and switching unit, required exchange of signals is performed with information-carrying digital signals that are structured and coordinated into data packets, with one address-related field, or field pointing towards an address, and one information-content-related field, or information-carrying field, or set of bits.

Communication systems that use data packets for required exchange of signals are previously known. One such system, to which a specifically preferred embodiment of the present invention is related, uses a number of digital bit positions coordinated into structured sets of bits. The sets of bits are structured and coordinated into data packets, for required exchange of signals.

Such structured data packets are called "data cells" in known asynchronous-transfer-mode (ATM) systems. Nevertheless, in the following, the expression "data packet" will be used in a simplifying and more general way, keeping in mind that the invention, with great advantage, can be used even in an ATM system where the data packets are called "data cells".

Data packets (data cells) of the kind relevant here are characterized by certain bit positions that are coordinated into a set of bits representing an address-related field or a field pointing towards an address (called a "header"). This field comprises, among other things a virtual address, also called a channel number. Other bit positions are coordinated into a set of bits representing a user-related information-carrying field or an information-content-related field (called a "payload"), comprising the data information from the user.

Through this separation into structured fields, or sets of bits, some of the bit positions of the address-related field can be structured to indicate and point out a specific destination address while the information-carrying bit positions are structured Into sets of bits within the information-carrying field, and are used to transfer desired information to the chosen receiver at the destination address.

The specific destination address can indicate the use of a chosen channel number. Such channel numbers are virtual and are usually valuable over a single physical link. It has thereby been proven advantageous to change the channel number whenever a data packet is to be directed from one link to another.

Data packets having the same address-related bit positions or fields and the same or different information-carrying bit positions or fields will in the following be said to be data packets of the same category, and there may be a first category, a second category, and so forth.

Such changes of channel numbers (data packets are thereby allotted to different categories) are therefore often performed on both incoming and outgoing sides of a switching unit within a telecommunication system that uses digital information.

It is further known to add data packets that are used solely for internal use by the switching unit to optimize certain functions hardware-wise within the switching unit. Such data packets use more bit positions than the amount of bit positions or sets of bits used in a standardized data packet. These switching-unit-internal data packets can be structured as a label, a label field, or label-related bit positions or sets of bits that can be added to incoming data packets to direct such data packets to the correct outgoing link based on the digital value of the bit positions of the added label.

The label field added to each respective data packet comprises a set of extra bit positions corresponding to the amount of bit positions in the address field, which are removed at the outgoing side of the switching unit. Thus, the label field only exists as a supplement to the standardized data packet as internal data packets within the selector switching unit.

It is further known that with telecommunication systems of this kind the use of a traffic arranging computer, belonging to the switching unit, is required to establish a connection through the switching unit. The traffic arranging computer or traffic computer is a very complicated unit that will not be described in detail in this application. Only the less complex part that is required to realize and understand the present invention will be described.

It is known that when a caller is making a call and wishes to establish contact, such as a voice contact, with a called subscriber, data packets are activated for transmission according to a standardized signalling protocol. The data packets can here be supposed to belong to a specific category in that the address-related bit positions or sets of bits call for a direct connection with the control computer as soon as they arrive at one of the free receiver circuits in the switching unit.

The address-related field thus comprises a specific channel number that calls for the direct engagement of the traffic computer, while the information-carrying field can hold information of a desired connection to a pointed out called subscriber.

The channel number is, in a previously known manner, read out of the address-related field whenever a data packet of this kind arrives at one of the free receiver circuits of the switching unit, and, when the channel number is interpreted as a calling channel number, the whole data packet is transmitted to the traffic computer for evaluation and processing.

At this point the information carrying field is evaluated and under guidance of this, and taking the momentary situation within the switching unit under consideration, the traffic computer selects an available connecting path through the switching unit via earlier known functions, and gives the call a new channel number which is notified to the caller. From this point the caller transmits its data packets with the new channel number. In this way, the data packets have been given a new category.

At every call and following setup of connections it is also earlier known to let the traffic computer write into a control memory what address-related fields and/or labels are to be given to every thereafter-incoming data packet with the given new channel number and what switch-internal chosen channel number these are to be given. Of course this is done in case a change of channel numbers is to be performed.

The control memory will therefore, in the normal case, comprise bit positions coordinated into a set of bits structured into a specific label, and coordinated bit positions structured into a specific address-related field, the latter representing the switch-internal channel number. This is done for every channel number given by the computer unit that will be used by the caller.

The control memory also needs to be configured in a way so that every above-mentioned bit position or set of bits will be assigned an addressing or addressable position in the memory.

The normal case will thus be that a control memory of this kind will comprise a large number of bit positions and a large number of bit positions that are coordinated into sets of bits within various address positions, representing a large number of established connections.

Every selected address position or address within the control memory will determine what label and what switch-internal channel number that is to be given to a certain received data packet.

Whenever a data packet having a channel number given by the control computer arrives at one of the available receiver units of the switching unit, it is determined, from its given channel number, which switch-internal connection it belongs to. Based on the channel number of the arriving data packet, a correct address position within the control memory can be pointed out where the label and switch-internal channel number are stored.

The label and the address-related field is at this point added to the data packet at hand by changing its incoming channel number to the switch-internal channel number, whereafter the data packet, with its changed channel number, is transmitted further through the switching unit.

It is also known to change channel numbers in the same way if a change of channel numbers is required on the outgoing side of the switching unit.

The invention is intended to control whether the information read out of the control memory is correct.

In view of the known prior art as described above, it must be regarded as a technical problem to be able to realize what measures and means are to be coordinated to be able to create a method and a control circuit or device that is to provide the technical advantages attached to the invention at hand, which are the possibilities to be able to control that an information read from a memory is correct before the information is used to control various functions and where the control consists of letting, amongst other things, the address of the memory position be a part of a control sum.

It will further be considered as a technical problem to, with simple means, be able to create such conditions that a first control sum can be calculated and stored separately at the entry of the switch-internal-related information intended to be stored; that another control sum can be calculated at the reading of the information; and that these control sums will be controlled and verified to be identical before the thus read information is to be used.

It must also be considered as a technical problem to be able to realize the advantages that reside in entering not only address-related bit positions but also control-sum-related bit positions into the memory, where the latter not only originate from the former but also from the bit positions that represent the address positions in the memory where the address-related bit positions or set of bits are stored.

It is a further technical problem, based on known prior art as described above and for a telecommunication system based upon data packets of bit positions and sets of bits such as an ATM system, to be able to realize that to achieve the technical advantages that reside in the invention a control and an activation of a traffic computer is required so that the traffic computer can calculate a control sum, such as parity bits, a check sum or likewise, valid for the address-related information that is to be stored in the control memory and a set of bits corresponding to a selected address in the memory, and that the traffic computer has to be controlled and activated to write the bit positions corresponding to a label and/or the bit positions corresponding to an address field and further the bit positions corresponding to the thus calculated control sum.

It must also be considered as a technical problem to be able to realize the importance of being able to use a known receiver unit, belonging to a switching unit, to receive each and every one of the arriving data packets to be able, in every data packet and depending on the bit positions coordinated within the channel number given by the control computer and represented by the address-related field, to read the corresponding information, stored in the control memory and pointed out by the channel number, where the information is to be added to respective data packets, for the purpose of switch-internal collecting functions, as a switch-internal address-related field, or switch-internal usable field or bit positions, instead of the channel number that has been given by the control computer to the data packets transmitted from the caller.

It is also a technical problem to be able to realize the necessity of and simplicity in calculating the relevant control sum with the same chosen algorithm or likewise, and to store it as parity bits or a check sum.

It is also a technical problem to be able to realize the importance of calculating the parity bits or check sums independent of each other using different calculating circuits or look up tables and thereby realize the high probability that is offered of a correct reproduction of read information and that a verified agreement between the check sums or parity bits can be made so that it can be known that no bit error has occurred in the information that has been stored in and read out of the control memory and that therefore the data packet at hand, with label and/or switch-internal address-related fields, can pass on through the switching unit.

There is also a technical problem in being able to realize the importance of letting the switch-internal address-related field also comprise a label field adapted to specific functions.

There is also a technical problem in being able to realize the advantages of letting the control computer perform parity calculations of the channel numbers within the information-related fields of respective incoming data packets.

SUMMARY

With the intention of solving one or more of the above stated technical problems, the present invention is based on a method and a control circuit or control device intended to control that a digital information, written into and stored within a memory, is correctly readable, before such read information, in the form of a number of bit positions coordinated into set of bits, is used to control one or several functions within a switching unit, where these functions can be activated by a computer unit. The selected address position, or positions, of the current digital information stored within the memory point out a first set of bits and a second set of bits, used as a control sum, where both sets of bits are required to perform the control of the function or functions.

According to the present invention, the second set of bits is determined based on the current bit positions valid for the first set of bits and on a third set of bits corresponding to the current address position selected for readout. A new control sum is determined following readout of the digital information. This new control sum is determined in the same way, but based on the current bit positions of the read information that correspond to the first set of bits and on a fourth set of bits corresponding to the currently selected address position, thereby forming a fifth set of bits. The read digital information is accepted as correct when a comparison shows agreement between the second and fifth sets of bits.

As proposed embodiments, within the scope of the present invention, it is indicated that the control sums are formed through a generation of parity bits or check sums according to a selected algorithm.

Further, the second set of bits used as a control sum is calculated in a first computer unit and the fifth set of bits used as a control sum is calculated in a second unit that can be a computer unit or selected hardware.

The invention is given a specifically suitable application when the method and control circuit is adapted to control functions within a switching unit inside a telecommunication system where the information-carrying digital signals, arriving at the switching unit from a caller, are structured into data packets of a first category having one address-related set and one information-related set of bits and where required exchange of signals within the switching unit is performed through information-carrying digital signals structured as data packets of a second category having one address-related set and one information-related set of bits. The switching unit may use a traffic computer which establishes a connection through the switching unit depending on the destination asked by a caller at the reception of data packets of the first category and where an address-related set of bits, corresponding to the selected connection through the switching unit, is transmittable to the caller and storable within a control memory at a selected address position. The address-related bit positions of a data packet of a third category thereafter arriving from the caller at the switching unit is exchanged with a data packet of the second category, corresponding to the selected connection and usable within the switching unit, before the data packet is transmitted through the switching unit.

In this embodiment, the traffic computer is initially activated to select an available connection, to generate an engaged signal, and to occupy the available connection through the switching unit. In doing so, the traffic computer points out an available connection through the switching unit based on the information content of the received data packet of the first category. A control sum and switch-internal address information, corresponding to the selected connection, are stored at a selected address in the control memory where the control sum is determined according to the current bit positions corresponding to the switch-internal address information and the current bit positions corresponding to the selected address in the control memory. A channel number to be given to the caller is preferably selected by the traffic computer. The caller is notified of the channel number, whereafter the caller transmits data packets of a third category. A unit adapted to receive incoming data packets reads the address information and depending of its content decides on selected addresses in the control memory. The unit is thereafter initiated to read the information that has been stored in the control memory and pointed out by the address information and that is to be added to the data packet. Then, the unit determines a new control sum, such as parity bits, for the complete address-related information and evaluated address in the control memory. Agreement between such new control sum and the previously stored control sum is interpreted as if no bit errors have occurred in the information read from the control memory, and the present switch-internal data packet of the second category can pass on through the switching unit.

As a proposed embodiment within the scope of this application, the switch-internal address-related bit positions are structured as a label field.

Further, the control computer also determines parity bits or likewise based on the channel number belonging to the respective arriving data packets.

The advantages primarily afforded by a method and device according to the present invention are that conditions have been created to be able, in a simple and fast manner, to evaluate whether information read from a memory, such as a control memory belonging to a switching unit within a telecommunication system, is correct by simply determining if two control sums, calculated or supplied by different units and at different points in time, agree with each other. With such an agreement, information read from the control memory is accepted as correct, and this information can be added to the address-related field of a data packet. This can be done by letting a control sum, stored in the memory, be calculated over the current address-related bit positions or set of bits and the bit positions or set of bits relevant to the address position of the memory corresponding to the address-related bit positions.

BRIEF DESCRIPTION OF THE DRAWINGS

An exemplifying embodiment of a device comprising features significant to the present invention functioning according to the method indicated by the present invention will now be described in more detail with reference to the accompanying drawings, in which:

FIG. 3 illustrates, very schematically, a control circuit or control device according to the invention, with one incoming subscriber-related data cell and one outgoing data cell with a complementary label;

FIG. 4 illustrates a standardized data cell with an added label field whose bit positions are intended for switch-internal use.

Figure 1:
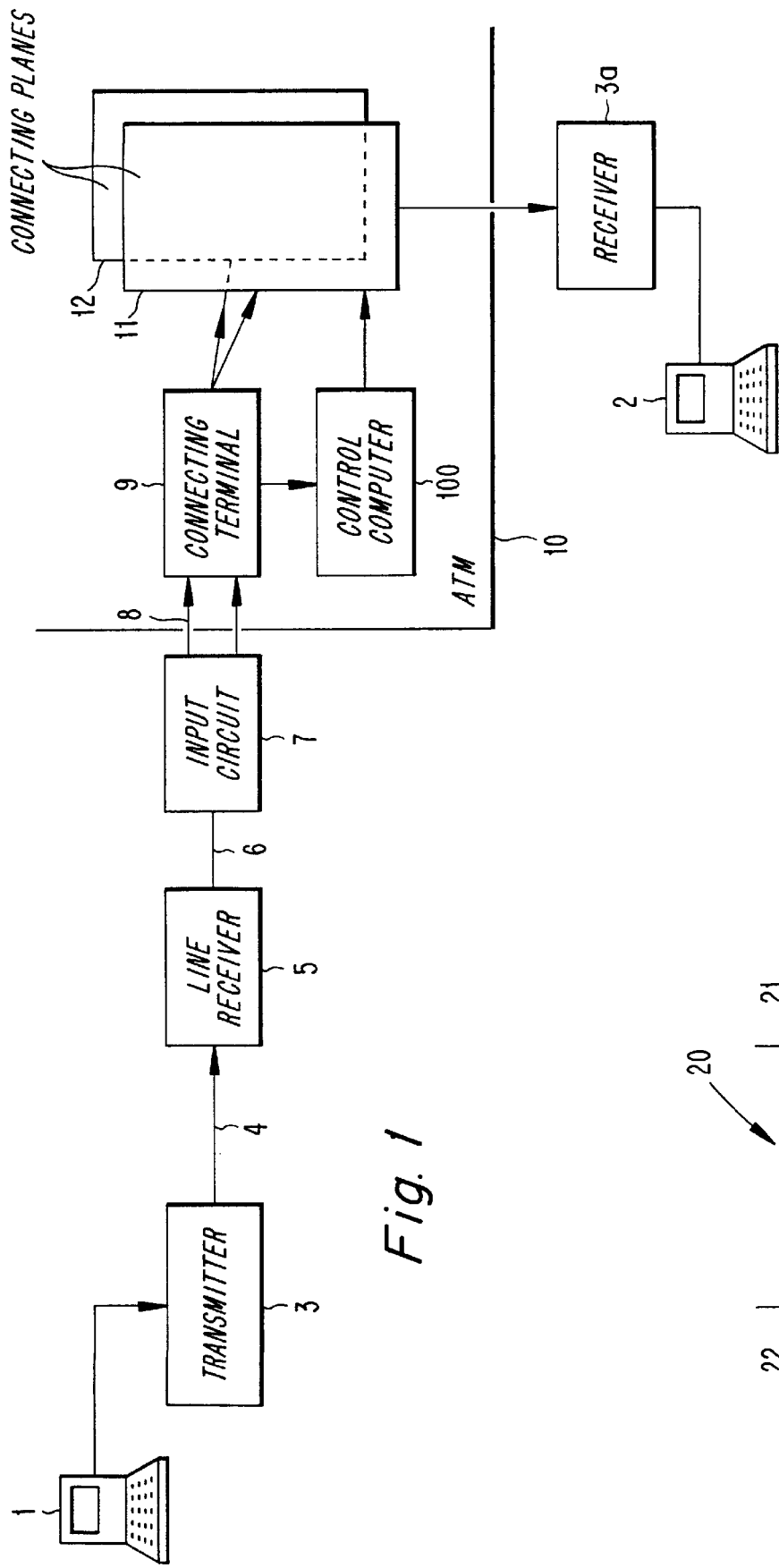
FIG. 1 illustrates a strongly simplified telecommunications system using ATM technology.

Various sets of bits have been given the following numbers in the drawings and the following description: a first set of bits have been numbered 33, 34 and comprises a number of bytes, a second set of bits have been numbered 35 and comprises one byte, a third set of bits have been numbered 32a and comprises a number of bytes, a fourth set of bits have been numbered 33, 34, 35 read out and comprises a number of bytes and a fifth set of bits have been numbered 35' and comprises one byte. One byte is an eight bit word.

DETAILED DESCRIPTION

With reference to FIG. 1, a strongly simplified telecommunication system is shown which is known under the designation ATM-system. For its function and exchange of signals, such a system uses data with bit positions that are coordinated into data packets or, more correctly, "data cells".

It will be appreciated by a person skilled in the art that the exchange of signals normally is directed in both ways but to simplify this description it will in the following only be described how a connection and exchange of signals is performed between a transmitter 3 belonging to a transmitting terminal unit 1 and a receiver 3a belonging to a receiving terminal unit 2.

The exchange of signals between the terminal units 1 and 2 is performed with the aid of data cells that are structured into a standardized protocol valid in the ATM system, where the structure is concerning the logical values and coordination into sets of bits of the individual bits.

Transmitter 3 coacts with a line-related receiving unit 5 over a line or connection. The receiving unit 5 is, through a line or connection 6, in connection with an input circuit 7 which is, through a line or connection 8, in coaction with a number of connecting terminals 9, belonging to an ATM selector 10. The selector is equipped with two redundant connecting planes or connecting cores 11, 12, and they coact with the signal receiving unit 3a through circuits (not shown) corresponding to circuits 9, 7 and 5. Each and every one of the lines 4, 6 and 8 can be made out of one or several physical wires or conductors.

Figure 2:
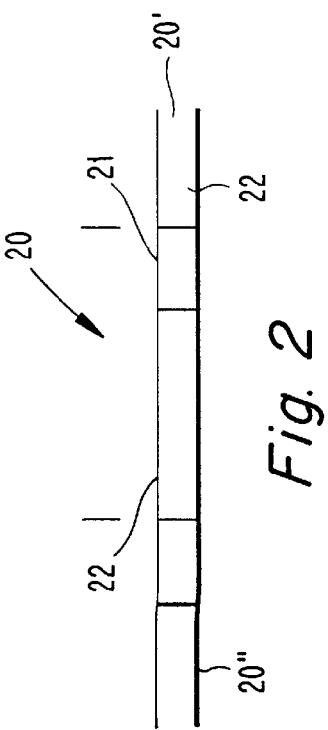
FIG. 2 illustrates a standard data cell used for the exchange of signals between a caller and a switching unit.

Every ATM selector requires for Its function that necessary signal transmission is performed with a number of bit positions structured into various fields or sets of bits to form cells of data. FIG. 2 is intended to illustrate such a standardized data cell 20. As indicated, it can have one partition or field 21 (a header) comprising a five-byte set (five eight-bit words) of address-informing or -carrying bits and another partition or field 22 (a payload) comprising a forty-eight-byte set (forty-eight eight-bit words) of information-carrying bits. Other information can also he coordinated into such a data cell 20.

FIG. 2 is intended to illustrate that data cells 20', 20 and 20" appear on conductor 4 in a sequential or serial manner with the information-carrying field 22' of a preceding data cell 20' immediately followed by the address-information-carrying field 21 and the information-carrying field 22 of a succeeding data cell 20, and so on.

A signal system according to FIG. 1 requires a number of earlier known, but in FIG. 1 not shown, instruments and functions to be able to work properly, but these will not be described or commented on further since they do not influence the functions of, or a full understanding of, the present invention.

It shall nevertheless be mentioned that the switching unit 10 comprises a control computer 100. The functions of the control computer 100 are, in a switching unit of this kind, very complex and the following description is only intended to describe the parts and functions that are of a direct relevance of, and required for the understanding of, the present invention.

Figure 5:
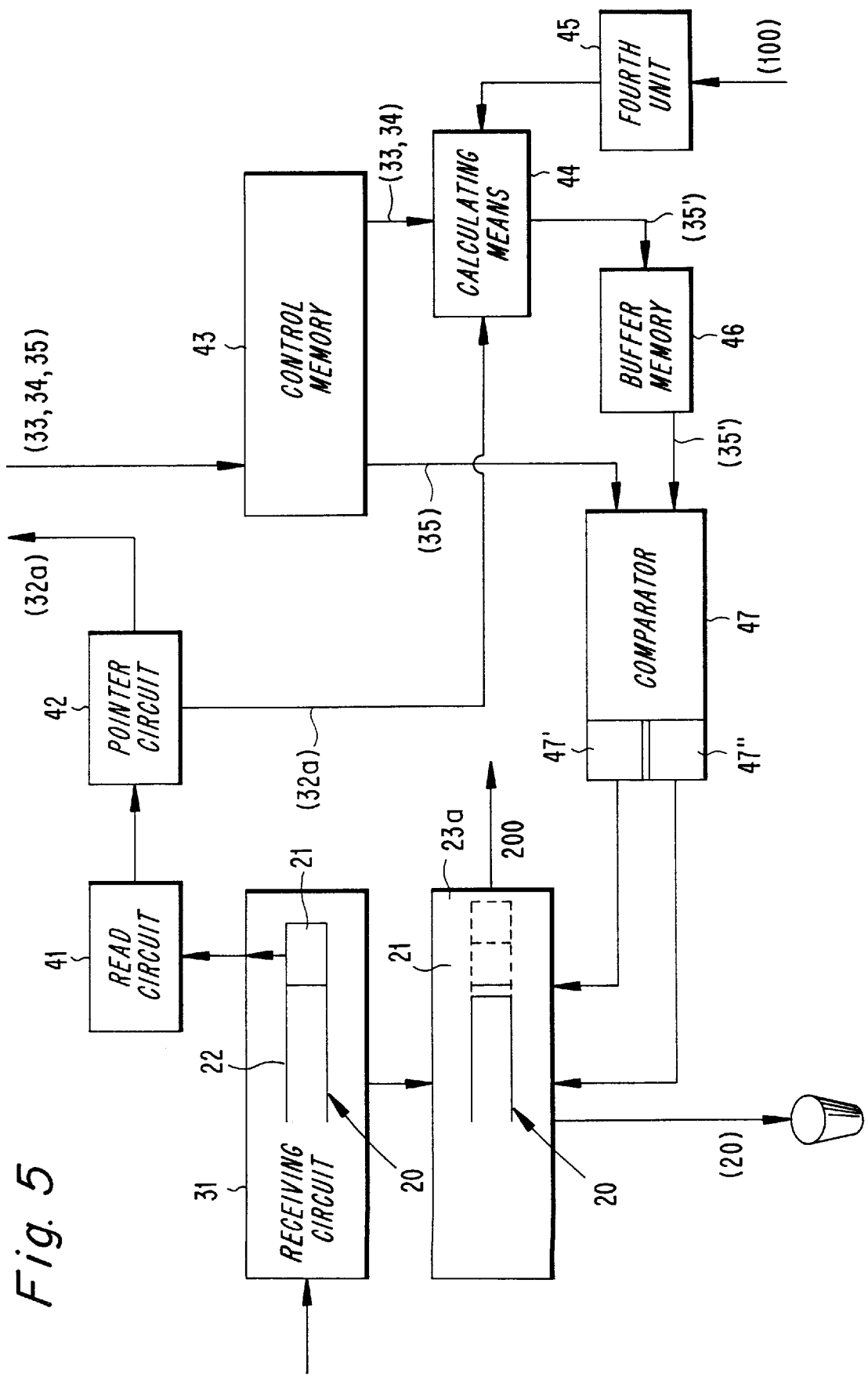
FIG. 5 is a block diagram of a receiving unit for receiving data cells and performing control according to the present invention.

In FIG. 3 is illustrated a receiving circuit 31, belonging to a switching unit within a telecommunication system, with a control circuit 30 which is described in greater detail in FIG. 5. The receiving circuit 31 can be part of the input circuit 7 or the circuit 9.

The control circuit 30 is a part of, or coacts with, the receiving circuit 31, which is intended to receive sequentially incoming data cells, and this is here intended to be a part of an input terminal belonging to the input circuit 7.

Data cells that are transmitted after a call has been initiated from a calling unit 1 to a called unit 2 will be standardized and comprise all information needed regarding a desired connection, as earlier has been described. Thus, transmitted data cells or packets belong to a first category (a calling category), and every call of this kind is, through switch internal equipment including the control computer 100, given one of several available channel numbers. The control computer 100 notifies at the same time the caller 1 of the channel number that is going to be valid for the following signal exchange with the called unit 2. The case can also be that the calling unit 1 specifies when channel number that will be used during the following exchange of signals.

The control computer 100 notifies the control circuit 30 in the receiving circuit 31 of the now-valid channel number for the calling unit 1 and of an address information, corresponding to this channel number, that points out the positions in a memory 32 where required information and selection of channel number is stored.

Known circuits in the control computer 100 are in a known manner used to select, point out and occupy an available channel through the switching unit 10 with the aid of the information content of the data cell. These circuits will in the here-described embodiment be illustrated to evaluate and select an available connection, to generate an engaged (busy) signal, to occupy the available connection through the switching unit, and to give this connection a specific channel number depending on the information within the address-related field and the information-carrying field of the data cell of a first category and depending on the momentary load of and number of engaged connections in the switching unit.

The control memory 32 is now formed so that a specific address position corresponds to every internal channel number selected to establish a connection through the switching unit.

The control computer 100 is arranged to store, within the bit positions in memory 32 indicated by the address information corresponding to the selected channel number, fields or sets of bit positions where one field of bit positions represents, amongst other things, the selected channel number through the switching unit; one field of bit positions represents functions for switch-internal use; and one set of bit positions represents a specifically calculated control sum, such as parity bits, calculated according to a selected algorithm. This is done for every call and connectable connection.

The receiving circuit 31 within the switching unit 10 that receives the data cells 20 from the caller 1 is, amongst other things, continuously evaluating the bit positions within the address-related set of bits in the data cells. At a specifically selected channel number (a calling channel number), the circuit 31 is activated to further transmit the complete data cell to the control computer 100 since this channel number indicates a call.

An available connection is evaluated when the control computer 100 receives such a call, and the connection is given another internally available channel number, viz., a switch-internal channel number. Normally the control computer transmits a message to the calling unit 1 to notify that a new channel number has been given to the desired connection and that all following data cells have to include the new channel number. The new channel number given to the caller 1 is notified to the receiving circuit 31 together with information concerning the respective internal channel number.

When data cells with the new channel number selected by the control computer 100 are received by the data cell receiving circuits 31, there is a table, within these receiving circuits, that indicates address positions corresponding to the channel number in the control memory 32.

The data cells 20 that arrive at the receiving circuits 31 with the new channel number 21 will thus be used to point out the correct address or position 32*a* within the control memory 32, that comprises the switch-internal information (33, 34) that is specific for the switch-internal selected connection that is to be used by the data cell 20.

The information that is sorted into the address 32*a* and has previously been created and stored into the control memory 32*a* by the control computer 100 is made out of a label field 33 that is to be added to the data packet 20 and/or a switch-internal channel number 34, which in this case is to replace the old channel number 21 of the data cell 20.

The label field 11 is used, among other things, for deciding what outgoing link the current data cell 20 is to be directed to by the switching unit. The label field can also comprise information concerning the quality, what type of connection that the cell belongs to, and what functions that are to be activated within the switching unit.

The traffic-arranging computer or control computer 100, that according to above-mentioned conditions controls and selects an available connection through the switching unit, writes the required information into the control memory 32 of the switching unit at the position or address 32*a* at the time of the occupation or establishment of the connection.

The information in this embodiment illustrates one label field 33, one channel number 34 intended for switch internal use, and one field 35 intended for a control sum, calculated by the computer unit 100 as a number of parity bits, a check sum or likewise. The control sum is calculated by the computer 100 according to a selected parity control, or likewise, of the bit positions in the fields 33, 34 and the relevant address 32*a* to the control memory 32.

It is thus of great importance for the reliability of the switching unit 10 that the information that is stored into and specially read out of the control memory 32 is correct. Any errors that for any reason might occur in the information in the control memory 32 have to be detected immediately and the current data cell that was to be added to the information in the control memory has to be discarded. It will be understood that if an error in the control memory is not detected and a data cell 20 with an erroneous label field and/or an erroneous channel number is allowed to pass through the switching unit, there is a great risk that the data cell will be directed to the wrong destination, which is very undesirable. The invention indicates a method and a device where such bit errors in the control memory easily can be detected.

With reference to FIG. 4 an embodiment is exemplified with one data cell 200 for switch-internal use, one address-related field 210, and one information-related field 220. The field 210 comprises the partitions 210*a*, 210*b*, and the bit positions within these partitions can be said to define the new channel number of the data cell 20.

The control computer 100 is normally supposed to add a label field 230, with a field 230*a*, that is to control the way of the data cell through the switching unit 10 to activate selected functions. The field 230 can preferably be placed as a field 33 within the memory 32 and the field 210 can be placed as a field 34 and 35. The bit positions 210*c* can comprise a control sum represented by the parity bits.

The construction and function of the control circuits that are significant for the invention under the previously described conditions will now be described in more detail and with reference to FIG. 5.

When the signal receiving circuit 31 receives an arriving data cell (20, 21) it initially reads the content of the address-related field 21 with a circuit 41. The current switching-unit-selected channel number is evaluated through the thus read information, and a transportation is performed to the corresponding switch-internal channel number. The address position or positions comprising required channel-number-related bit positions intended for switch-internal use, coordinated into the fields 33 and 34 and also the field 35, are thereafter pointed out by a second circuit 42. The channel-number-related bit positions are then brought down to a memory 43.

The correctness of the bit positions within memory 43, relevant for the switch-internal channel number, must be determined before the bit positions are added to the information-carrying part 22 of the data cell 20. The bit positions in the fields 33 and 34, and their digital values, are calculated by a third unit 44 with the same control function, exemplified as a parity control function as in the control computer 100, through a fourth unit 45. A control sum is thereby calculated, as parity bits, and while doing so the bit positions of the evaluated address (32*a*) of the memory 32 are also taken into consideration.

The thus calculated control sum 35' (parity bits) is stored within a buffer memory 46 and presented to a comparator 47 where the stored bit positions in the field 35 are compared to the bit positions 35' generated by the calculation in the unit 44. The add circuit 47' is activated to add the fields 33, 34 and eventually the field 35 to the data cell 20 as a label 23*a* if there is an agreement indicated by the comparator. The discard circuit 47" is activated and the data cell (20) is thereby discarded if there is a lack of agreement.

Further functions are required to detect errors in the hardware that might cause the wrong address position in the control memory 32 to be pointed out. An error of this kind, resulting in the wrong address being pointed out, typically occurs when one of the transistors driving the address bus is stuck in a certain position, either at high or low voltage, or when a hardware error concerning the address decoding of the control memory occurs.

The traffic computer 100 can calculate a number of control sums, such as parity bits, from the information that is to be written into the control memory 32 to be able to detect errors causing the wrong memory position to be pointed out. These control sums are calculated in the same manner as in the case of detecting bit errors with the difference that the parity calculations in this case also include the channel number of the arriving data cells.

Thus, the traffic computer writes the intended information and calculated control sum (parity) into the control memory. When a data cell arrives at the receiving unit, an address in the control memory is generated based upon the channel number of the arriving data cell. The receiving unit calculates a parity from the above-mentioned information and the channel number of the current data cell. The result of this calculation is compared to the control sum (parity bits) that has been written into the control memory 32 by the control computer 100 at the set up of the connection. A bit error in the control memory or a hardware error in the control memory 32 or in the receiving circuit 31 has occurred if the control sum (parity bits) in the control memory 32 does not correspond to the parity calculated by the receiving unit.

It is obvious that the meaning of "parity bits" used in the described embodiment can be exchanged to a check sum calculated according to a selected algorithm.

It will be understood that the invention is not restricted to the aforesaid and illustrated exemplifying embodiments thereof and that modifications can be made within the scope of the following claims.

What is claimed is:

1. A method of determining that digital information stored in a memory is correctly read before the digital information is used for controlling a function activated by a computer unit, wherein the digital information includes a number of coordinated bit positions, comprising the steps of:

determining a selected address position in the memory corresponding to the stored digital information, wherein a set of bits for controlling the function and a first control sum are stored at the address, the first control sum calculated from the set of bits and the selected address;

following read out of the digital information from the memory determining a second control sum from the selected address and read out set of bits for controlling the function; and comparing the first control sum and the second control sum, whereby the digital information is determined to be correct if the first and second control sums agree.

2. The method of claim 1, wherein the first and second control sum are determined according to a selected algorithm.

3. The method of claim 1, wherein the first control sum is determined by a first computer unit and the second control sum is determined by a second computer unit.

4. A device for ensuring that digital information stored in a memory is correctly read before the digital information is used for controlling a function activated by a computer unit, wherein the digital information includes a number of coordinated bit positions, comprising:

means for determining a selected address position in the memory corresponding to the stored digital information, wherein a set of bits for controlling the function and a first control sum are stored at the address, the first control sum calculated from the set of bits and the selected address;

means for determining a second control sum from the selected address and read out set of bits for controlling the function following read out of the digital information from the memory; and means for comparing the first control sum and the second control sum, whereby the digital information is determined to be correct if the first and second control sums agree.

5. The device of claim 4, wherein the first and second control sum are determined according to a selected algorithm.

6. The device of claim 4, wherein the first control sum is determined by a first computer unit and the second control sum is determined by a second computer unit.

7. A method of determining that digital information stored in a selected address position in a memory is correctly readable before the digital information is used for controlling a function activated by a computer unit, wherein the digital information comprises a number of coordinated bit positions including a first set of bits for controlling or activating the function and a second set of bits serving as a control sum, comprising the steps of:

reading the digital information stored in the selected address position and arranging the digital information into the first set of bits and the second set of bits;

calculating a new control sum, wherein the new control sum is calculated in the same way as the second set of bits but based on the readout set of first bits and said selected address position; and comparing the control sum and the new control sum, whereby the digital information is determined to be correct when the comparison finds agreement.

8. The method of claim 7, wherein the control sum and the new control sum are determined according to a selected algorithm.

9. The method of claim 7, wherein the control sum is determined by a first computer unit and the new control sum is determined by a second computer unit.

10. A telecommunications system for transferring information-carrying digital signals comprising:

a switching unit for receiving and routing information-carrying digital signals;

a traffic unit for establishing a connection through the switching unit based on a destination included in the information carrying digital signals;

a control circuit storing a new address corresponding to a connection through the switching unit, wherein the traffic computer establishes the connection by determining an available connection through the switching unit; writing to the control circuit at a selected address the new address corresponding to the available connection and a first control sum determined from the selected address and the new address; informing a caller of the new address; receiving information-carrying signals including the new address and determining a second control sum based thereon; comparing the first control sum and the second control sum, whereby the digital information carrying signals are routed through the switching unit to the destination if first and second control sums agree.

* * * * *